United States Patent [19]

Yokoyama

[11] Patent Number: 5,107,417

[45] Date of Patent: Apr. 21, 1992

[54] ADDRESS TRANSLATING METHOD FOR TRANSLATING VIRTUAL ADDRESS TO REAL ADDRESS WITH SPECIFIED ADDRESS REGISTER TO ALLOW BYPASS OF TRANSLATION STEPS

[75] Inventor: Yasushi Yokoyama, Tokyo, Japan

[73] Assignee: NEC Corporation, Tokyo, Japan

[21] Appl. No.: 255,603

[22] Filed: Oct. 11, 1988

[30] Foreign Application Priority Data

Oct. 8, 1987 [JP] Japan ................. 62-252362

[51] Int. Cl.⁵ .............. G06F 13/00; G06F 9/30; G06F 12/8

[52] U.S. Cl. ............. 395/500; 364/256.3; 364/256.5; 364/255.8; 364/247.8; 364/DIG. 1

[58] Field of Search ... 364/200 MS File, 900 MS File

[56] References Cited

U.S. PATENT DOCUMENTS

| | | | |
|---|---|---|---|
| 3,723,976 | 3/1973 | Alvarez et al. | 364/200 |
| 3,902,164 | 8/1975 | Kelley et al. | 364/200 |
| 4,296,468 | 10/1981 | Bandoh et al. | 364/200 |
| 4,320,456 | 3/1982 | Heise et al. | 364/200 |
| 4,374,417 | 2/1983 | Bradley et al. | 364/200 |
| 4,551,797 | 11/1985 | Amdahl et al. | 364/200 |
| 4,612,612 | 9/1986 | Woffinden et al. | 364/200 |
| 4,631,660 | 12/1986 | Woffinden et al. | 364/200 |
| 4,654,777 | 3/1987 | Nakamura | 364/200 |
| 4,682,281 | 7/1987 | Woffinden et al. | 364/200 |
| 4,691,282 | 9/1987 | Kinoshita | 364/200 |
| 4,757,447 | 7/1988 | Woffinden et al. | 364/200 |
| 4,769,770 | 9/1988 | Miyadera | 364/200 |
| 4,774,653 | 9/1988 | James | 364/200 |
| 4,785,398 | 9/1988 | Joyce et al. | 364/200 |
| 4,835,734 | 5/1989 | Kodaira et al. | 364/900 |

*Primary Examiner*—Thomas C. Lee
*Assistant Examiner*—Larry Donaghue
*Attorney, Agent, or Firm*—Foley & Lardner

[57] ABSTRACT

An address converting method for use in a data processor with a virtual memory. The method includes a step for generating effective addresses by the use of address registers, and a step for deciding whether or not an operating mode which is defined for each process is in an activated state. The method also includes a step responsive to a positive determination at the previous step for determining whether or not an address register having a specific reference number was used in the generation of the effective addresses, and a step responsive to a negative determination at the foregoing step for converting an effective address into a physical address. Furthermore, the method includes a step which is responsive to a positive decision of the step determining register use for treating the effective address generated as a physical address, and a step for accessing a memory by the physical address resulting from the conversion step or that from the physical address step.

2 Claims, 3 Drawing Sheets

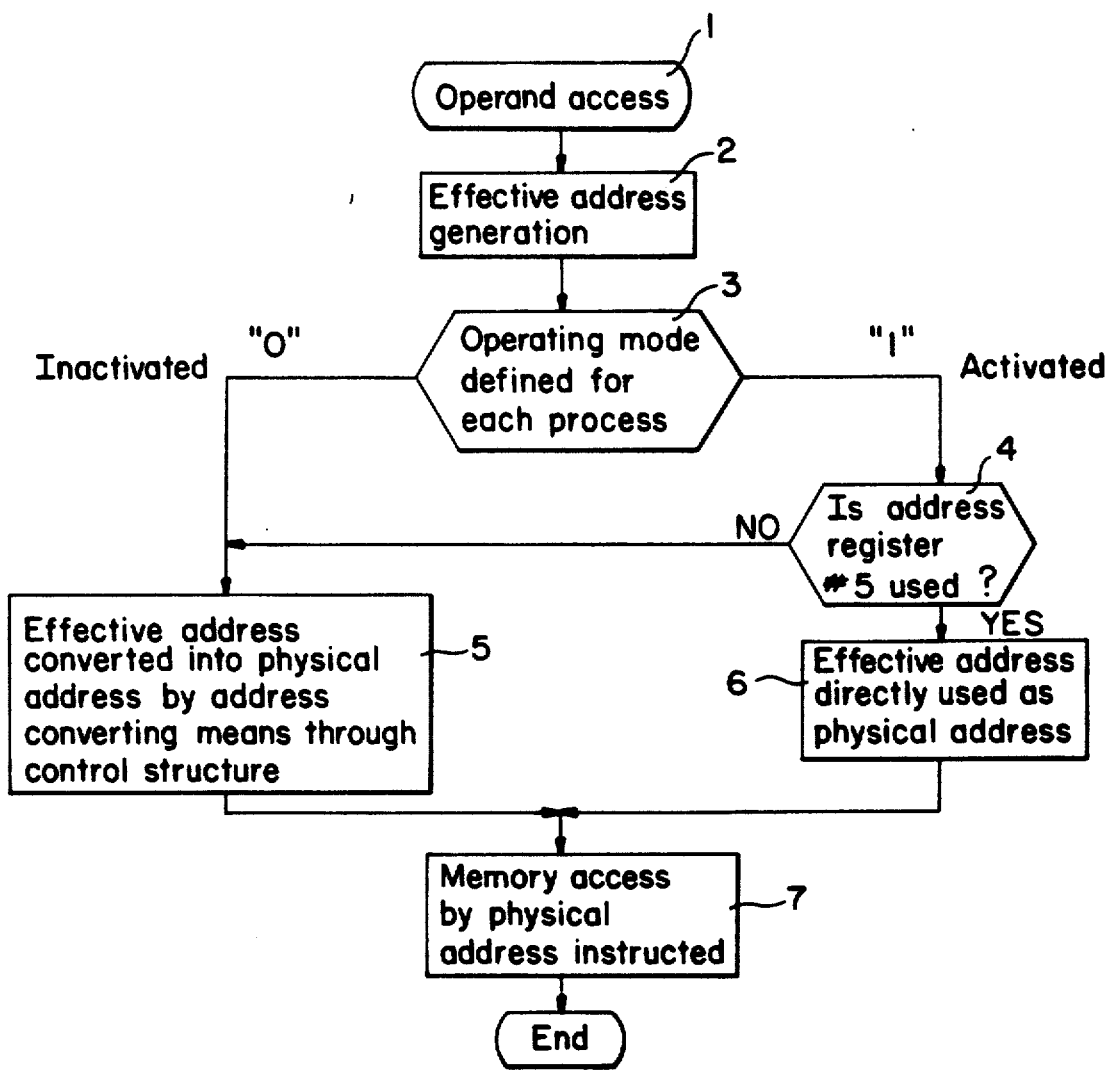

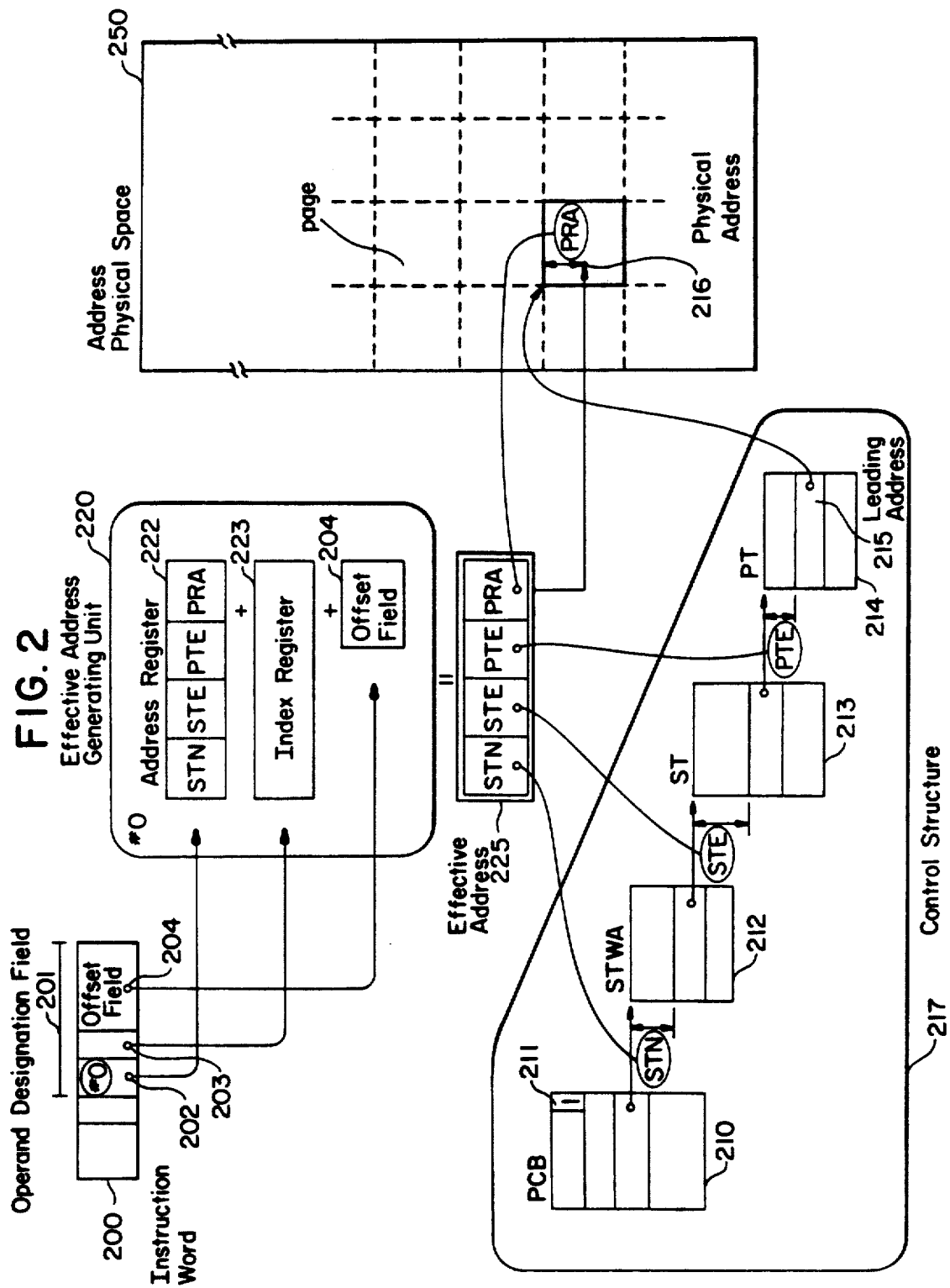

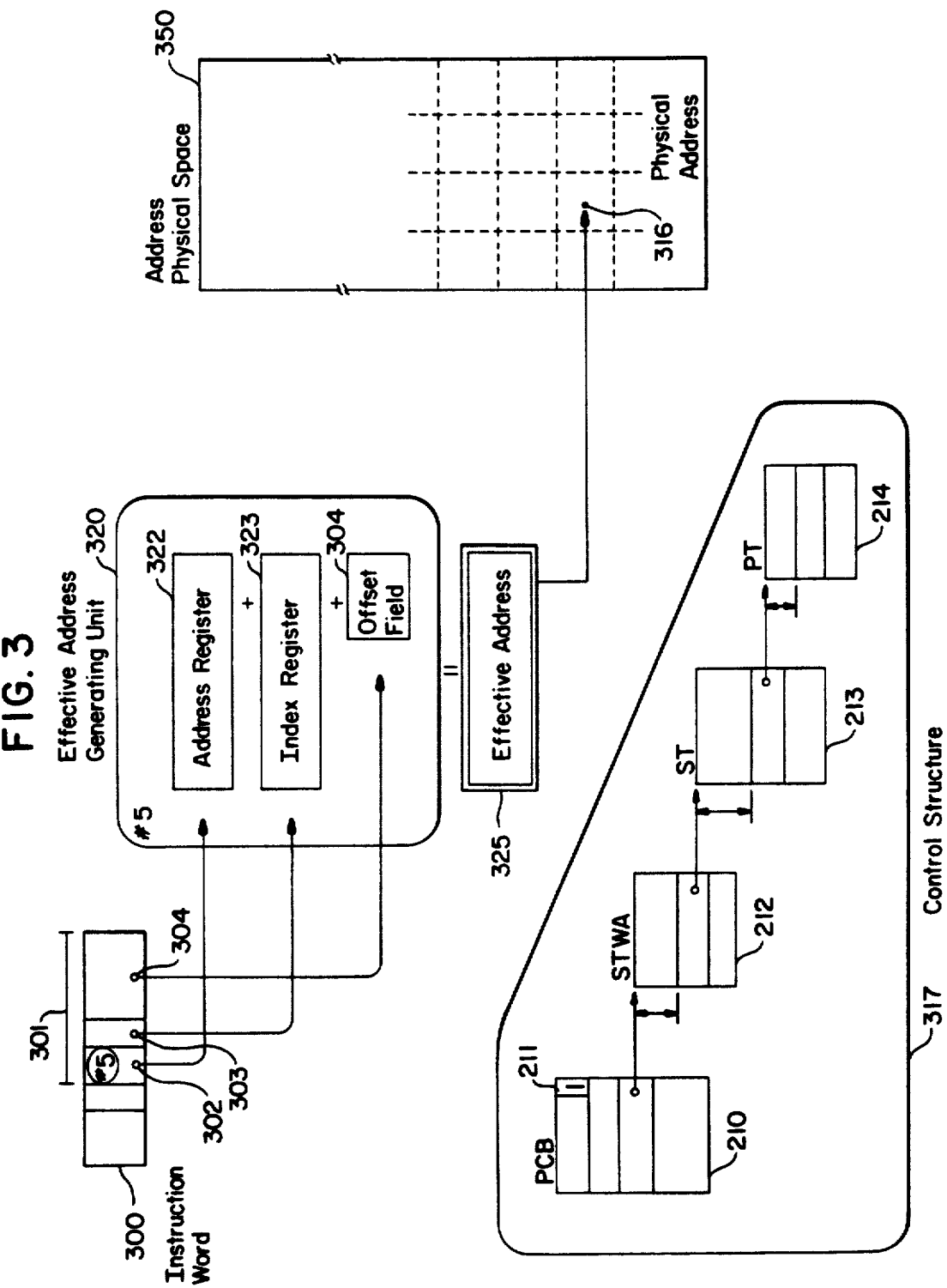

ADDRESS TRANSLATING METHOD FOR TRANSLATING VIRTUAL ADDRESS TO REAL ADDRESS WITH SPECIFIED ADDRESS REGISTER TO ALLOW BYPASS OF TRANSLATION STEPS

BACKGROUND OF THE INVENTION

The present invention relates to an address converting method for use in a data processor with a virtual memory.

Along with the dramatic expansion of the applicable range of digital computers in recent years, a large memory space has come to be required. For this reason, there are extensively used virtual memory systems which permit expansion of the memory space without concern for the real size of the main memory. In such a system, the virtual address space is usually defined on a segment-by-segment or page-by-page basis for the physical address space of a real memory apparatus, which is realized with a main memory, and addresses in this virtual address system are designated by the use of logical addresses.

The physical address space in the above-mentioned real memory apparatus is used in small partitions, each corresponding to a page of logical addresses. Each page of a virtual address space required in the execution of processing is taken out of an external memory apparatus, such as a magnetic disk unit, and stored in one of the small partitions of the physical address space for subsequent use. Control of this procedure is accomplished with a control program known as a virtual memory manager to effectively utilize the limited physical space.

Conversion of logical addresses into physical addresses is accomplished by the address converting section of the data processing apparatus through a control structure consisting of a "table" of segment descriptors, page descriptors and the like which are present in the main memory. A conversion buffer, such as a translation lookaside buffer (TLB), is used for high-speed accomplishment of this address conversion In a data processing apparatus using a similar virtual memory system, a computer program (hereunder referred to simply as "program") written in a machine language expresses all addresses in logical terms alone. However, in a privileged program as an operating system (OS), expression in physical addresses is frequently needed because the above-mentioned control structure consisting of a "table" of segment descriptors, page descriptors and the like have to be referred to and updated.

Methods used for accessing by physical addresses include the following.

A plurality of consecutive segments, equivalent to the capacity of the physical address space, are secured in the logical address space for use in accessing by the physical addresses. Further, pages in each segment are made to consecutively correspond with consecutive regions of the physical addresses. As a result, the physical address space is made to correspond with the logical addresses of specific segments, and accessing of consecutive memory spaces (physical addresses) by the use of consecutive logical addresses is thereby made possible.

For example, a first segment and a second segment are allocated to the physical address space for accessing by a physical address, and either the first or the second segment is selected by the former or latter half of this physical address. As a result, a segment address and an intra-segment relative address are synthesized into a logical address, by which the physical address space can be accessed, and at this time continuity is maintained in each segment. If these two specific segments can be secured in consecutive regions of the logical address space, further continuity and identity between the logical and physical addresses can be attained.

However, along with the significant rise of the degree of integration of semiconductor memories in recent years, the capacity of the physical address space keeps increasing. A consequence of this is the difficulty to secure the physical address space capacity over the logical address space for the purpose of accessing by physical addresses.

Meanwhile, International Business Machines, Inc. has proposed a system using an operating mode for accessing a memory by the use of logical addresses as physical addresses. However, where accessing by logical addresses and accessing by physical addresses may co-emerge in a single program, switching of the operating mode is required every time, resulting in the disadvantage of overhead loss.

SUMMARY OF THE INVENTION

One object of the present invention is, therefore, to provide an address converting method free from the disadvantages described above.

According to one aspect of the invention, there is provided an address converting method which comprises: an effective address generation step for generating effective addresses by the use of address registers; an operating mode decision step for deciding whether or not the operating mode, defined for each process, is in an activated state; a register use decision step responsive to an affirmative decision at the foregoing operating mode decision step for deciding whether or not an address register having a specific reference number was used in the generation at the effective address generation step; an address conversion step responsive to a negative decision at the register use decision step for converting an effective address generated at the effective address generation step into a physical address; a physical address step responsive to an affirmative decision at the register use decision step for treating the effective address generated at the effective address generation step as a physical address; and a memory access step for accessing a memory by the physical address resulting from the conversion at the address conversion step or that from the physical address step.

BRIEF DESCRIPTION OF THE DRAWINGS

The above-described and other features and advantages of the present invention will be made more apparent from the detailed description hereunder when taken in conjunction with the accompanying drawings, in which:

FIG. 1 is a flow chart of a preferred embodiment of the invention, and

FIGS. 2 and 3 illustrate address conversions by the preferred embodiment shown in FIG. 1.

In the drawings, the same reference numerals denote respectively the same structural elements.

DETAILED DESCRIPTION OF THE PREFERRED EMBODIMENT

For a data processor to which the present invention is applicable, the unit of processing execution is called a process, and the source program is divided into a plurality of processes permitting parallel execution, which are executed in synchronism with one another.

Each process has, as one of its functions, a memory region in which registered values on the data processor are to stand by when this particular process is not being executed on the processor. The plural processes have in common a process control block (PCB) including the pointer of a starting point to a control structure indicating the logical address space of each process.

Referring to FIGS. 1 and 2, a preferred embodiment of the invention has an operand access step 1 for accessing effective address generating unit 220 in response to the content of an operand designation field 201 of an instruction having an operand being executed on the processor; an effective address generation step 2 for adding the content of an address register 222 indicated by the content of an address register designation field in said operand designation field 201, that of an index register 223 indicated by the content of an index register designation field in said operand designation field 201, and the offset of an offset field 204 in said operand designation field 201 to generate an effective address; and an operating mode decision step 3 for deciding whether an operating mode 211 present on the PCB 210 of the process being executed on said processor is in an activated state "1" or an inactivated state "0".

A characteristic feature of the present invention is the specific meaning assigned to a specific address register number indicated by the content of the address register designation field 202.

It is supposed now that #5 is a specific address register number in the preferred embodiment of the invention. When any other address register number than this specific address register number #5 is indicated, an effective address 225 generated on the basis of the content of the address register 222 for that non-specific number is treated as an ordinary logical address. However, when the specific address register number #5 is indicated, an effective address (325 in FIG. 3) generated on the basis of the content of the address register 222 for that specific number is treated as a physical address.

The preferred embodiment of the invention further has a register number decision step 4 for deciding, in response to the activated state "1" of the operating mode at the operating mode decision step 3, whether or not the content of the address register designation field 202 of an instruction word 200 indicates the specific address register number.

If the operating mode is decided to be in an inactivated state at the decision step 3 or the content of the address register designation field 202 of the instruction word 200 does not indicate the specific address register number #5 at the decision step 4, the effective address is converted into a physical address (step 5).

In this case, if the operating mode 211 on the PCB 210 is "0" or an inactivated state, there will be no dependence on the address register number indicated by the address register designation field 202.

This address conversion takes place in the following manner. Referring to FIG. 2, the effective address 225, like any address stored in the address register 222, consists of segment numbers (STN and STE), a page number (PTE) and an intra-page relative address (PRA).

A control structure 217 has the PCB 210, a segment table indicating word (STWA), a segment table (ST) and a page table (PT).

Access by an address consisting of a prescribed content (the leading address of STWA) of the PCB 210 and a segment number (STN) added to it, results in the reading of a prescribed content (the leading address of an ST 213) from an STWA 212. Access by an address consisting of the leading address of this ST 213 and a segment number (STE) added to it, results in the reading of a prescribed content (the leading address of a PT 214) from the ST 213. Access by an address consisting of the leading address of this PT 214 and a page number (PTE) added to it gives the leading address 215 of a prescribed page in a physical address space from the PT 214. Addition of an intra-page relative address (PRA) of the effective address 225 to this leading address 215 gives the desired physical address 216. This address conversion into a physical address through the control structure 217 is accomplished by the address converting section (not shown) of the data processor.

Referring again to FIG. 1, the memory is accessed by the physical address 216 obtained by the address conversion at step 5 (step 7).

Referring now to FIGS. 1 and 3 together, when the content of the address designation field 202 of the instruction word 200 indicates the specific address register number #5 at step 4, an effective address 325 generated by effective address generating unit 320 proves to be the desired physical address 316. In this case, therefore, the memory is accessed by the desired physical address 316 of a physical address space 350 without address conversion by the use of the control structure 317.

One of the characteristic features of the present invention is that it provides an operation mode for accessing by an effective address generated by an address register having a specific reference number, said effective address being used as it is as the physical address. This feature makes possible ready accessing by physical addresses, which is needed in privileged processes.

Further by the differentiated use of address register numbers, the invention permits co-presence of ordinary logical address accessing and privileged physical address accessing in a single process without suffering the overhead loss from switching.

What is claimed is:

1. An address translation device in a data processing system of the type in which, words are individually assigned virtual addresses from a large virtual addressing set, a main memory is addressed by a relatively small set of real addresses and said virtual address set includes virtual addresses which require conversion to real addresses prior to their use in accessing said main memory, said device comprising:

an address generation means for generating an effective virtual addresses from an instruction word including an address register number of a base virtual address, offset to said base virtual address, and an index register number sub-offset to said base virtual address;

a storage means for storing an operating mode representing whether the mode is in an activated state;

a memory access means which reads and writes data on a main memory by using a given real address;

an address translation means for translating virtual addresses to real addresses and sending real addresses to said memory access means when said operating mode is in an activated state and at the same time said address register number of said effective virtual address is not equal to a particular number and for sending said effective virtual address as a real address to said memory access means when said operating mode is in an activated state and at the same time said address register number of said effective virtual address is equal to a particular number.

2. An address translation device as recited in claim 1, wherein said operation mode stored in said storage means is defined for each PROCESS.

* * * * *